(12) United States Patent
Channer et al.

(10) Patent No.: US 8,479,762 B1
(45) Date of Patent: Jul. 9, 2013

(54) SELF COVERING FLUID DISPENSING APPARATUS

(76) Inventors: Ennevor Channer, Gaithersburg, MD (US); Faithlyn Channer, Gaithersburg, MD (US)

( * ) Notice: Subject to any disclaimer, the term of this patent is extended or adjusted under 35 U.S.C. 154(b) by 483 days.

(21) Appl. No.: 12/780,089

(22) Filed: May 14, 2010

(51) Int. Cl.
*F16K 27/08* (2006.01)
(52) U.S. Cl.
USPC .......................................................... 137/381
(58) Field of Classification Search
USPC .............. 137/378, 379, 380, 381, 382, 382.5, 137/377
See application file for complete search history.

(56) References Cited

U.S. PATENT DOCUMENTS

| | | | |
|---|---|---|---|
| 1,058,637 A * | 4/1913 | Shephard et al. | 137/381 |
| 1,142,579 A * | 6/1915 | Jones | 137/381 |
| 2,475,164 A * | 7/1949 | Thomsen | 137/381 |
| 3,410,303 A | 11/1968 | Johnson | |
| D270,704 S | 9/1983 | Ruxton et al. | |
| 4,557,507 A | 12/1985 | Commandeur et al. | |
| 5,152,314 A | 10/1992 | Yandle | |
| 5,224,509 A | 7/1993 | Tanaka et al. | |
| 5,524,823 A | 6/1996 | Miller | |

\* cited by examiner

*Primary Examiner* — Craig Schneider
*Assistant Examiner* — Jonathan Waddy

(57) ABSTRACT

A self covering fluid dispensing apparatus includes a housing that has a first end, a second end and a peripheral wall. A lumen is defined within the housing and is fluidly coupled to an outlet aperture extending through the first end. An inlet conduit is mounted to the housing and is fluidly coupled to the lumen. A covering assembly is attached to the housing and is positioned in a closed position covering the outlet aperture or in an open position exposing the outlet aperture. A valve assembly is mounted to the housing and selectively opens or closes the lumen. The valve assembly includes a covering actuator that actuates the covering assembly to the open position when the valve assembly is placed in an opened condition and disengages from the covering assembly and allows the covering assembly to return to the closed position when the valve assembly is a closed condition.

3 Claims, 5 Drawing Sheets

SELF COVERING FLUID DISPENSING APPARATUS

BACKGROUND OF THE INVENTION

Field of the Invention

The present invention relates to fluid dispensing devices and more particularly pertains to a new fluid dispensing device for covering the open end of a spigot to prevent material from settling on the spigot when it is not being used.

SUMMARY OF THE INVENTION

The present invention meets the objectives needs presented above by generally comprising a housing that has a first end, a second end and a peripheral wall extending between the first and second ends. A lumen is defined within the housing and is fluidly coupled to an outlet aperture extending through the first end of the housing. An inlet conduit is mounted to the housing and is fluidly coupled to the lumen. Fluid entering the inlet conduit flows through the lumen and outwardly through the outlet aperture. A covering assembly is attached to the housing. The covering assembly is positioned in a closed position covering the outlet aperture or in an open position exposing the outlet aperture. A valve assembly is mounted to the housing and selectively opens or closes the lumen between the inlet conduit and the outlet aperture. The valve assembly includes a covering actuator. The covering actuator actuates the covering assembly to the open position when the valve assembly is placed in an opened condition. The covering actuator disengages from the covering assembly and allows the covering assembly to return to the closed position when the valve assembly is a closed condition.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
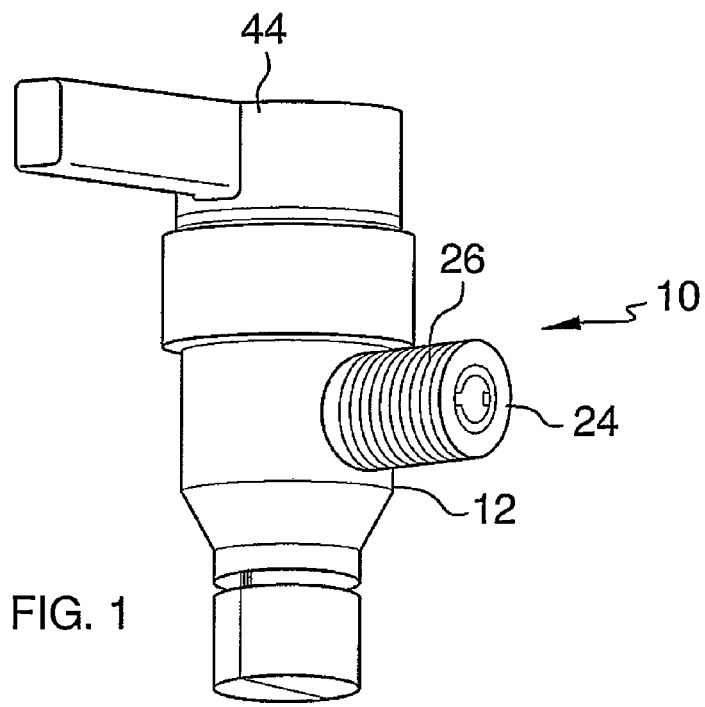
FIG. 1 is a bottom perspective view of a first embodiment of a self covering fluid dispensing apparatus according to the present invention.
Figure 2:
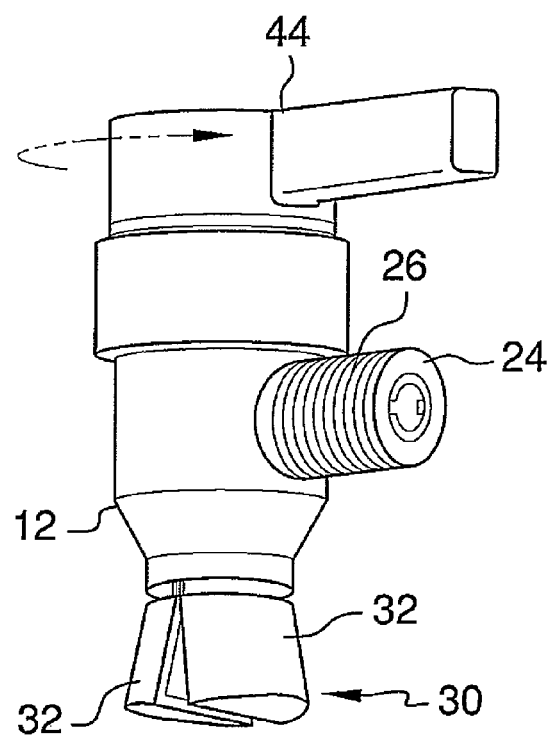
FIG. 2 is a bottom perspective view of the first embodiment of the present invention in an open position.
Figure 3:
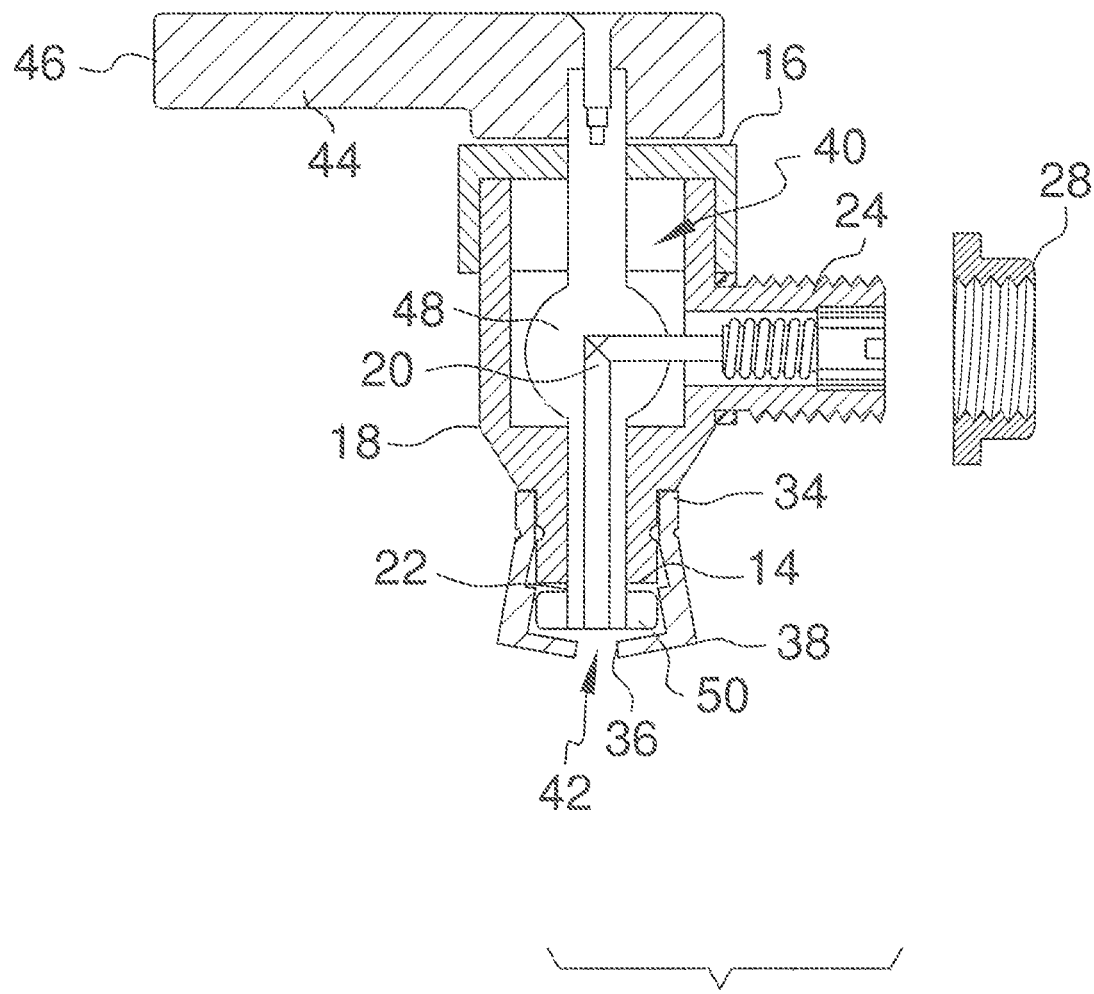
FIG. 3 is a cross-sectional view of the first embodiment of the present invention.
Figures 4, 5:
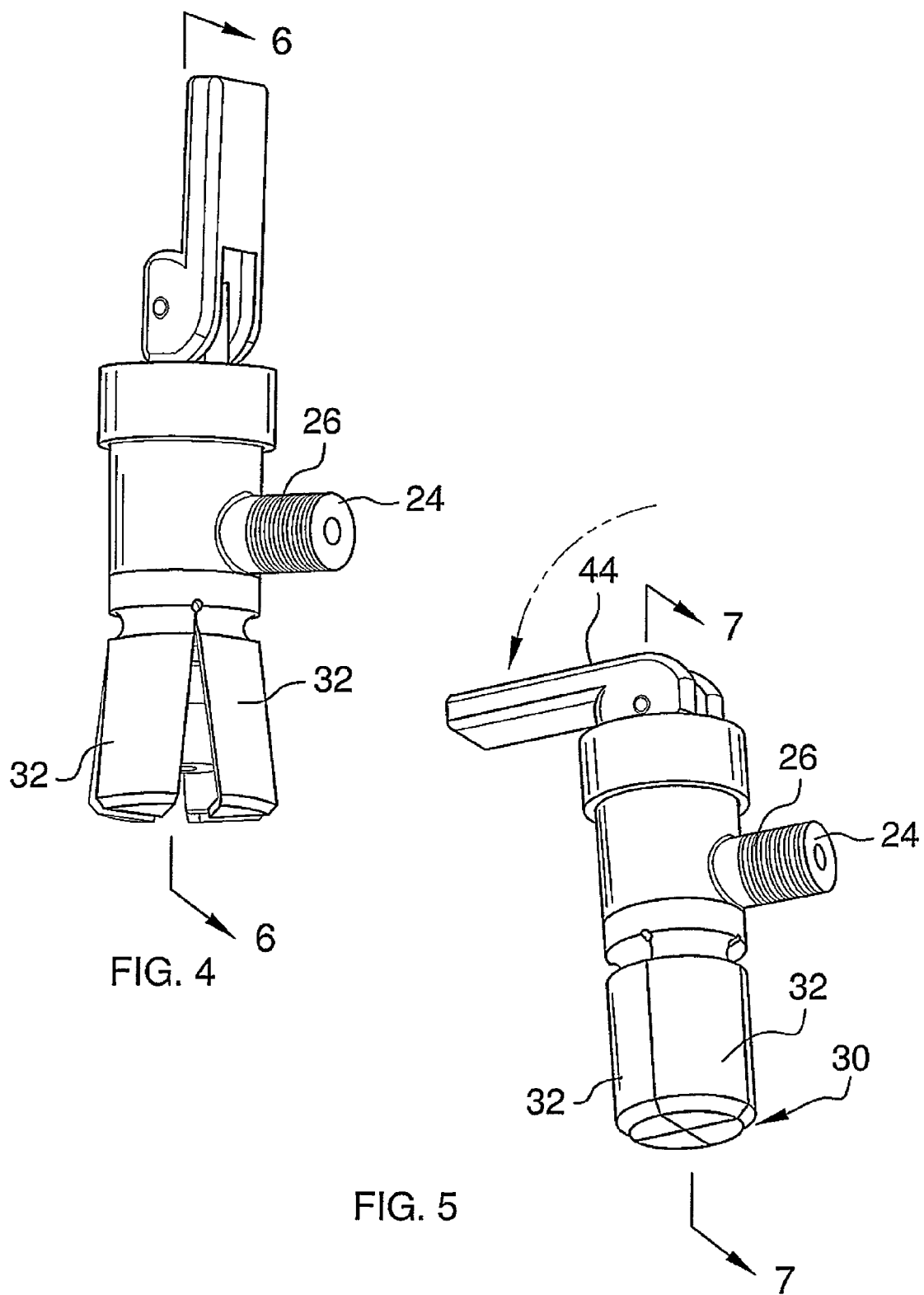
FIG. 4 is a bottom perspective view of a second embodiment of the present invention in an open position.
FIG. 5 is a bottom perspective view of the second embodiment of the present invention in a closed position.
Figure 6:
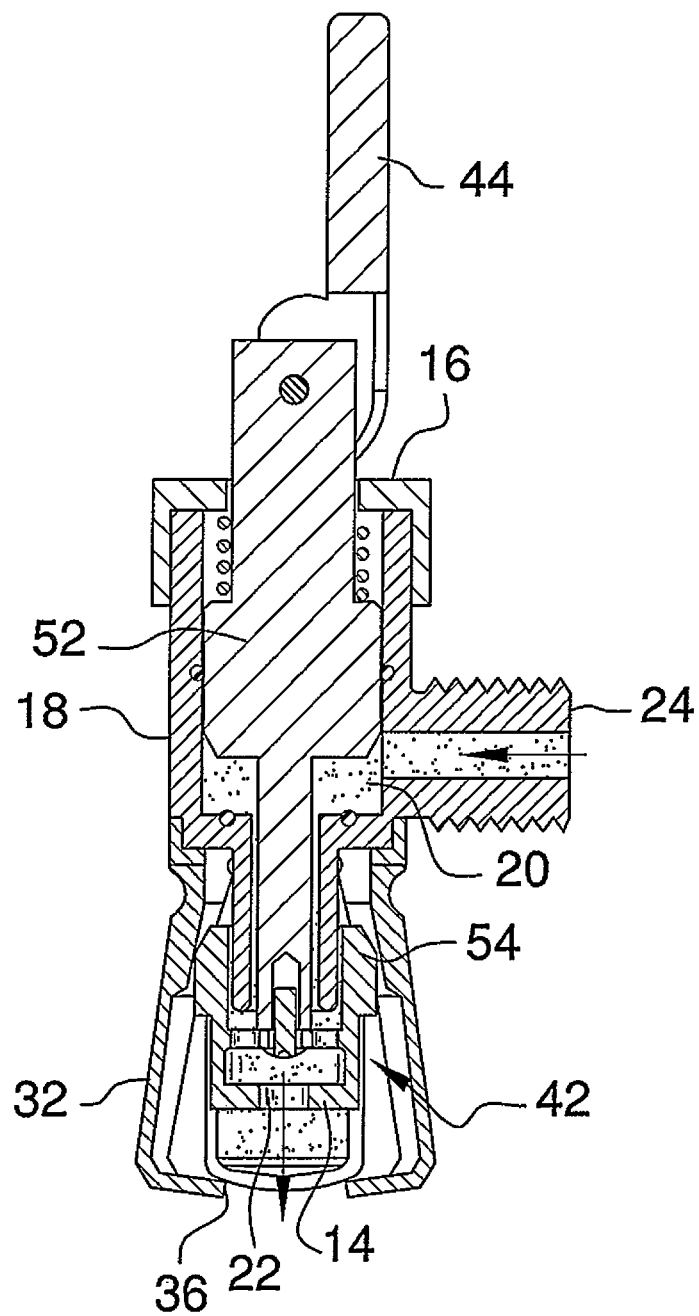
FIG. 6 is a cross-sectional view of the present invention taken along line 6-6 of FIG. 4.
Figure 7:
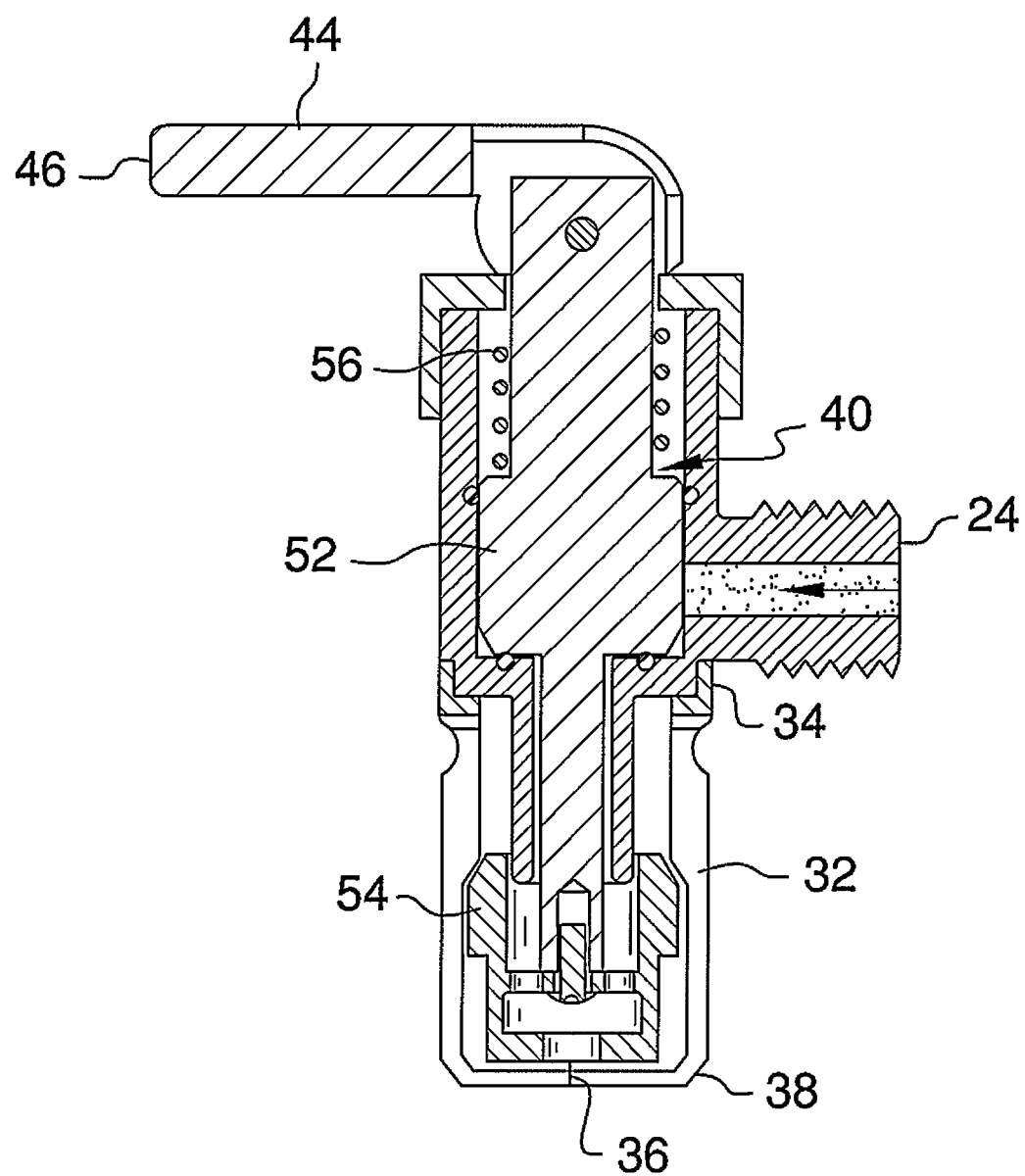
FIG. 7 is a cross-sectional view of the present invention taken along line 7-7 of FIG. 5.

With reference now to the drawings, and in particular to FIGS. 1 through 7 thereof, a new fluid dispensing device embodying the principles and concepts of the present invention and generally designated by the reference numeral 10 will be described.

As best illustrated in FIGS. 1 through 7, the self covering fluid dispensing apparatus 10 generally comprises a housing 12 that has a first end 14, a second end 16 and a peripheral wall 18 extending between the first 14 and second 16 ends. A lumen 20 is defined within the housing 12 and is fluidly coupled to an outlet aperture 22 extending through the first end 14 of the housing 12. The housing 12 may be comprised of a stainless steel material.

An inlet conduit 24 is mounted to the housing 12 and is fluidly coupled to the lumen 20. Fluid entering the inlet conduit 24 flows through the lumen 20 and outwardly through the outlet aperture 20. The inlet conduit 24 has a threaded outer surface 26. A coupling nut 28 may be positioned on the inlet 24 to fluidly couple a fluid delivery conduit or a cooler to the inlet coupler. This will allow the housing 12 to dispense fluids such as soda pop, beer, juice or water.

A covering assembly 30 is attached to the housing 12 and is positioned in a closed position covering the outlet aperture 22 or in an open position exposing the outlet aperture 22. The covering assembly 30 includes a plurality of arms 32. Each of the arms 32 has an attached end 34 and a free end 36. Each of the attached ends 34 is attached to the peripheral wall 18 and the free ends 36 are biased toward the housing 12. The free ends 36 may be biased by the material itself which is resiliently flexible or by strapping means. Each of the arms 32 has a bend 38 therein positioned adjacent to the first end 14 of the housing 12 such that the free ends 36 extend toward each other and abut each other when the covering assembly 30 is in the closed position. As shown in a first embodiment of FIGS. 1-3, the number of arms 32 may be two arms. A second embodiment shown in FIGS. 4-7 includes four arms.

A valve assembly 40 is mounted to the housing 12 and selectively opens or closes the lumen 20 between the inlet conduit 24 and the outlet aperture 22. The valve assembly 40 includes a covering actuator 42. The covering actuator 42 actuates the covering assembly 30 to the open position when the valve assembly 40 is placed in an opened condition. The covering actuator 42 disengages from the covering assembly 30 and allows the covering assembly 30 to return to the closed position when the valve assembly 40 is a closed condition. The valve assembly 40 includes a grip 44 mechanically coupled to the covering actuator 42 and is selectively actuated to move the valve assembly 40 to either of the closed or opened conditions.

In the first embodiment, the grip 44 is rotatably coupled to the second end 16 of the housing 12 and an outer end 46 of the grip 44 is rotatable laterally about an axis of housing 12. The grip 44 is coupled to a ball valve 48 and rotates the ball valve 48 when the grip 44 is rotated. The ball valve 48 opens or closes the lumen 20. The ball valve 44 is attached to a cam 50. The cam 50 spreads apart the free ends 36 of the arms 32 when the grip 44 is rotated to actuate the valve assembly 40 to the opened condition. The cam 50 disengages from the arms 32 when the grip 44 is rotated to actuate the valve assembly 40 to the closed position. The cam 50 engages wider portions of the arms 32 when the cam 50 is opening the arms 32.

In the second embodiment, the grip 44 is pivotally coupled to the second end 16 of the housing 12 and an outer end 46 of the grip 44 is pivotable vertically with respect to the second end 16 of the housing 12. The valve assembly 40 includes the grip 44 being coupled to a plunger valve 52 and lifts or lowers the plunger valve 52 when the grip 44 is pivoted. The plunger valve 52 opens or closes the lumen 20. The plunger valve 52 is attached to a cam 54. The cam 54 spreads apart the free ends 36 of the arms 32 when the grip 44 is lifted to actuate the valve assembly 40 to the opened condition. The cam 54 disengages from the arms 32 when the grip 44 is pivoted downwardly to actuate the valve assembly 40 to the closed position. When lifted, the cam 54 on the plunger valve 52 extends into a space between the housing 12 and the arms 32 to force the second ends 36 of the arms 32 apart. When lowered, the cam 54 moves out of the space between the arms 32 and the housing 12 to allow the second ends 36 to move back toward each other and cover the first end 14 of the housing 12. A spring 56 is mounted in the housing 12 and biases the plunger valve 52 downwardly into the closed position.

In use, the apparatus 10 is used to dispense fluids, such as soda pop or beer or as s dispenser from a cooler, by fluidly coupling the inlet conduit 24 to a fluid supply line or the cooler. The valve assembly 40 is opened or closed as desired to dispense fluid from the housing 12. The covering assembly 30 covers the first end 14 of the housing 12 when the valve assembly 40 is closed to prevent insects, dust, bacteria and the like from settling on the first end 14 of the housing 12 or entering the aperture 22.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A self covering fluid dispensing apparatus comprising:
a housing having a first end, a second end and a peripheral wall extending between said first and second ends, a lumen being defined within said housing and being fluidly coupled to an outlet aperture extending through said first end of said housing;
an inlet conduit being mounted to said housing and being fluidly coupled to said lumen, wherein fluid entering said inlet conduit flows through said lumen and outwardly through said outlet aperture;
a covering assembly being attached to said housing, said covering assembly being positioned in a closed position covering said outlet aperture or in an open position exposing said outlet aperture;
a valve assembly being mounted to said housing and selectively opening or closing said lumen between said inlet conduit and said outlet aperture, said valve assembly including a covering actuator, said covering actuator actuating said covering assembly to said open position when said valve assembly is placed in an opened condition, said covering actuator disengaging from said covering assembly and allowing said covering assembly to return to said closed position when said valve assembly is in a closed condition;
said covering assembly including a plurality of arms, each of said arms having an attached end and a free end, each of said attached ends being attached to said peripheral wall, said free ends being biased toward said housing, each of said arms having a bend therein positioned adjacent to said first end of said housing such that said free ends extend toward each other and abut each other when said covering assembly is in said closed position;
said valve assembly including a grip mechanically coupled to said covering actuator and being selectively actuated to move said valve assembly to either of said closed or opened conditions;
said grip being pivotally coupled to said second end of said housing and an outer end of said grip being pivotable vertically with respect to said second end of said housing;
said valve assembly including said grip being coupled to a plunger valve and lifts or lowers said plunger valve when said grip is pivoted, said plunger valve opening lumen; and
said valve assembly including said plunger valve being attached to said covering actuator comprising a cam, said cam spreading apart said free ends of said arms when said grip is lifted to actuate said valve assembly to said opened condition, said cam disengaging from said arms when said grip is pivoted downwardly to actuate said valve assembly to said closed position.

2. A self covering fluid dispensing apparatus comprising:
a housing having a first end, a second end and a peripheral wall extending between said first and second ends, a lumen being defined within said housing and being fluidly coupled to an outlet aperture extending through said first end of said housing;
an inlet conduit being mounted to said housing and being fluidly coupled to said lumen, wherein fluid entering said inlet conduit flows through said lumen and outwardly through said outlet aperture, said inlet conduit having a threaded outer surface;
a covering assembly being attached to said housing, said covering assembly being positioned in a closed position covering said outlet aperture or in an open position exposing said outlet aperture, said covering assembly including a plurality of arms, each of said arms having an attached end and a free end, each of said attached ends being attached to said peripheral wall, said free ends being biased toward said housing, each of said arms having a bend therein positioned adjacent to said first end of said housing such that said free ends extend toward each other and abut each other when said covering assembly is in said closed position;
a valve assembly being mounted to said housing and selectively opening or closing said lumen between said inlet conduit and said outlet aperture, said valve assembly including a covering actuator, said covering actuator actuating said covering assembly to said open position when said valve assembly is placed in an opened condition, said covering actuator disengaging from said covering assembly and allowing said covering assembly to return to said closed position when said valve assembly is in a closed condition, said valve assembly including a grip mechanically coupled to said covering actuator and being selectively actuated to move said valve assembly to either of said closed or opened conditions; and said grip being pivotally coupled to said second end of said housing and an outer end of said grip being pivotable vertically with respect to said second end of said housing, said valve assembly including said grip being coupled to a plunger valve and lifts or lowers said plunger valve when said grip is pivoted, said plunger valve opening or closing said lumen, said valve assembly including said plunger valve being attached to said covering actuator comprising a cam, said cam spreading apart said free ends of said arms when said grip is lifted to actuate said valve assembly to said opened condition, said cam disengaging from said arms when said grip is pivoted downwardly to actuate said valve assembly to said closed position.

3. A self covering fluid dispensing apparatus comprising:

a housing having a first end, a second end and a peripheral wall extending between said first and second ends, a lumen being defined within said housing and being fluidly coupled to an outlet aperture extending through said first end of said housing;

an inlet conduit being mounted to said housing and being fluidly coupled to said lumen, wherein fluid entering said inlet conduit flows through said lumen and outwardly through said outlet aperture;

a covering assembly being attached to said housing, said covering assembly being positioned in a closed position covering said outlet aperture or in an open position exposing said outlet aperture;

a valve assembly being mounted to said housing and selectively opening or closing said lumen between said inlet conduit and said outlet aperture, said valve assembly including a covering actuator, said covering actuator actuating said covering assembly to said open position when said valve assembly is placed in an opened condition, said covering actuator disengaging from said covering assembly and allowing said covering assembly to return to said closed position when said valve assembly is in a closed condition;

said covering assembly including a plurality of arms, each of said arms having an attached end and a free end, each of said attached ends being attached to said peripheral wall, said free ends being biased toward said housing, each of said arms having a bend therein positioned adjacent to said first end of said housing such that said free ends extend toward each other and abut each other when said covering assembly is in said closed position; and said valve assembly including a plunger valve being attached to said covering actuator comprising a cam, said cam spreading apart said free ends of said arms when said valve assembly is actuated to said opened condition, said cam disengaging from said arms when said valve assembly is actuated to said closed position.

* * * * *